Figure 1:
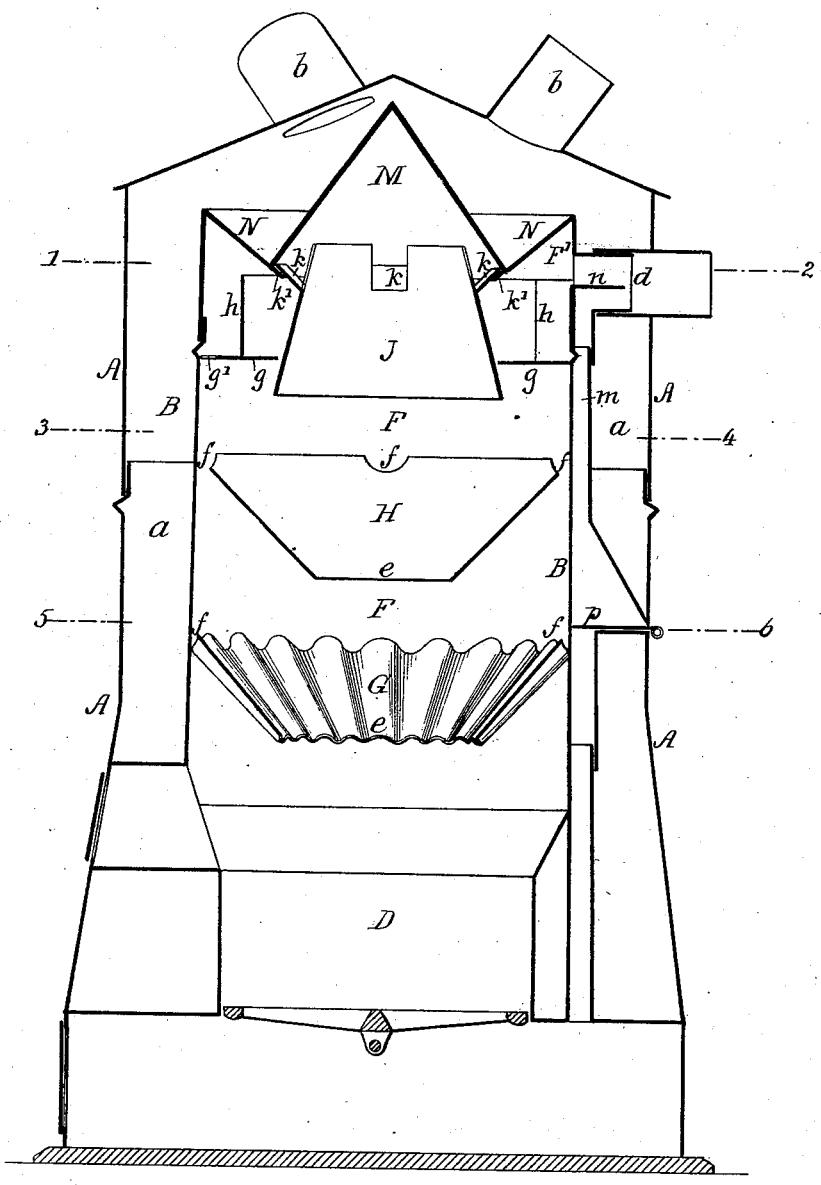

(No Model.)

H. J. PELSTRING.
HOT AIR FURNACE.

No. 281,551. Patented July 17, 1883.

WITNESSES:
Harry Drury
David Williams

INVENTOR:
Henry J. Pelstring
By his Attorneys
Howson and Son

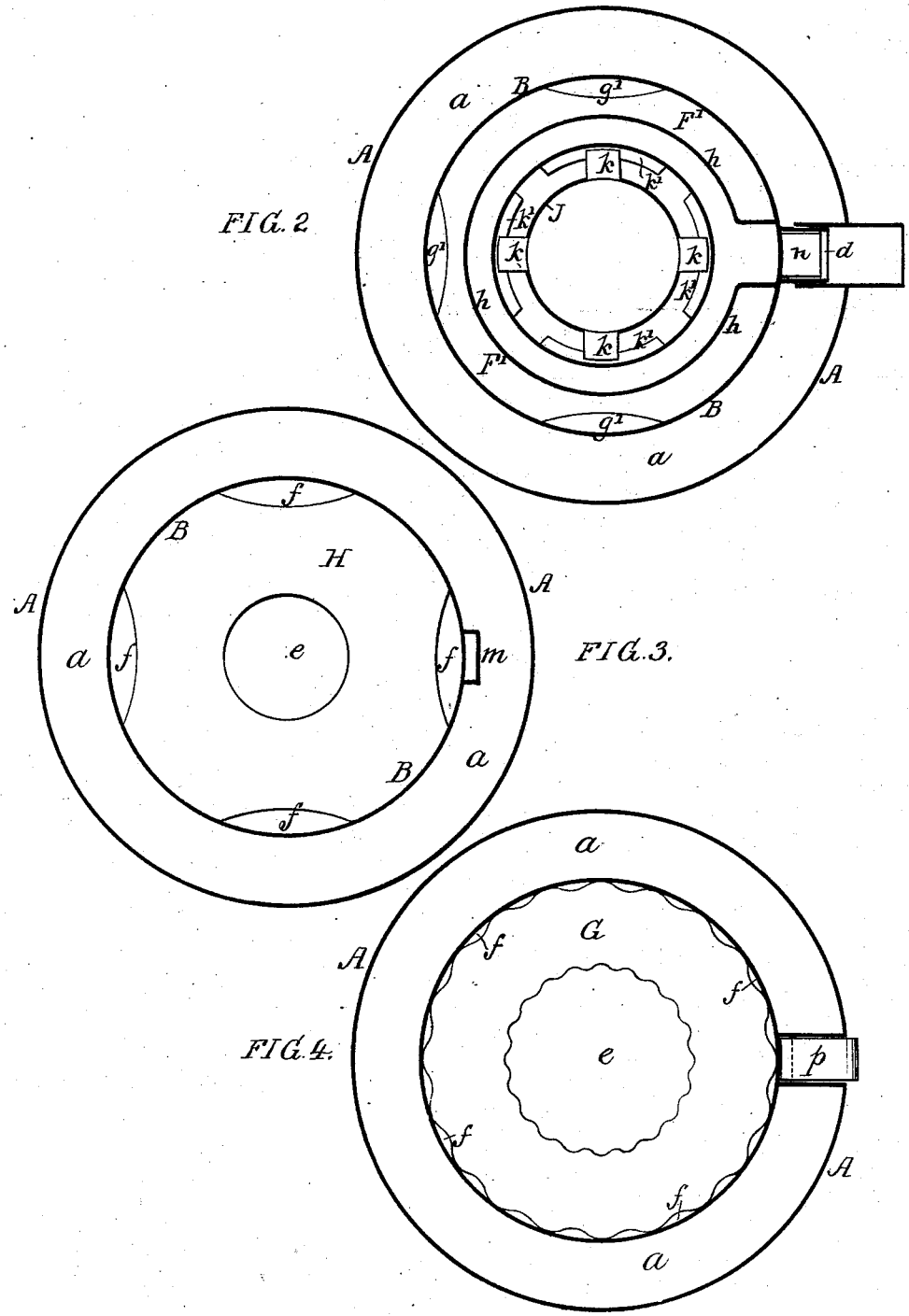

UNITED STATES PATENT OFFICE.

HENRY J. PELSTRING, OF PHILADELPHIA, PENNSYLVANIA.

HOT-AIR FURNACE.

SPECIFICATION forming part of Letters Patent No. 281,551, dated July 17, 1883.

Application filed March 20, 1883. (No model.)

*To all whom it may concern:*

Be it known that I, HENRY J. PELSTRING, a citizen of the United States, and a resident of Philadelphia, Pennsylvania, have invented certain Improvements in Stoves or Heaters, of which the following is a specification.

The object of my invention is to so construct a heating-stove or attachment for stoves that the products of combustion before being allowed to escape will be compelled to take a circuitous course in contact with the air-heating surfaces, and this object I attain in the manner which I will now proceed to describe, reference being had to the accompanying drawings, in which—

Figure 1 is a vertical section of my improved air-heating stove or furnace; Fig. 2, Sheet 2, a sectional plan on the line 1 2; Fig. 3, a sectional plan on the line 3 4, and Fig. 4 a sectional plan on the line 5 6.

A is the outer casing of the stove, and B the casing of the combustion-chamber, an air-heating chamber, $a$, intervening between these two casings, said chamber receiving cold air at the bottom and discharging the heated air at the top through the usual pipes, $b$.

D is the fire-place, and F the combustion-chamber, the latter communicating at the upper end, through a pipe, $d$, with an adjacent flue or chimney. In the combustion-chamber F are a series of annular inclined deflectors, G, H, and J, the deflectors G and H flaring outwardly from bottom to top, so as to direct the products of combustion from the center to the sides of the chamber F, and the deflector J being contracted from bottom to top, so as to concentrate the products of combustion upon the under side of a cone, M, in the center of the depressed top N of the combustion-chamber. The deflector G is directly above the fire-place, and is preferably corrugated, so as to be free to expand and contract readily. The deflector H is located above the deflector G, and has a central opening, $e$, considerably less in diameter than that of the said deflector G, whereby as the products of combustion rise from the fire-place D a portion of the same are thrown outward by the deflector G, and a further portion by the deflector H, the remainder passing up under the control of the deflector J, by which they are directed to the cone M. Both deflectors G and H have around the outer edges openings $f$ for the upward passage, close to the casing B, of the products of combustion directed toward said casing by the deflectors. The upper portion, F', of the combustion-chamber F is cut off from the lower portion by a partition, $g$, around the edge of which are formed openings $g'$, for the passage of the products of combustion, which rise close to the casing B, and in said chamber F' is a vertical deflector, $h$, whereby the said products are caused to come into contact with the depressed top N of the chamber, the latter, in connection with the cone M, presenting a large heating-surface.

The deflector J is supported in position by means of lugs $k$, which bear upon a notched flange, $k'$, in the cone, so that the deflector can be readily removed by turning the same until its lugs coincide with the notches.

On one side of the casing B is a pipe, $m$, which communicates below with a pipe leading to the ash-pit of the stove, the upper end of said pipe $m$ terminating in the pipe $d$, in which is a deflector, $n$. In the pipe $m$ is a valve, $p$, by manipulating which communication may be opened between the pipe $d$ and the ash-pit, so as to form a dust-flue or a cold-air passage for checking draft, the valve being closed when it is not desired to use the pipe $m$ for either of these purposes.

The casing B, with its deflectors, may be used, in connection with a stove-pipe, as a radiator or heating-drum, instead of forming part of a heating-furnace.

I claim as my invention—

1. The combination of the casing B with the upwardly and outwardly flaring deflectors G and H, having central openings, $e$, and openings $f$ around their outer edges, the central opening of the upper deflector being less in diameter than that of the lower deflector, as set forth.

2. The combination of the casing B, having a central cone, M, in the top, with the deflectors G and H for directing the products of combustion outwardly, and an inwardlyflaring deflector, J, beneath the cone M, as set forth.

3. The combination of the casing B, having a depressed top, N, with central cone, M, with means for supplying products of combustion to said casing B, and with a side outlet for said products of combustion, as set forth.

4. The combination of the combustion-chamber F F', the partition $g$, having openings $g'$, and the deflector $h$, as set forth.

In testimony whereof I have signed my name to this specification in the presence of two subscribing witnesses.

HENRY JOSEPH PELSTRING.

Witnesses:
  HARRY L. ASHENFELTER,
  HARRY SMITH.